United States Patent
Hariharan et al.

(10) Patent No.: US 11,888,756 B2
(45) Date of Patent: Jan. 30, 2024

(54) SOFTWARE LOAD BALANCER TO MAXIMIZE UTILIZATION

(71) Applicant: PAYPAL, INC., San Jose, CA (US)

(72) Inventors: Rema Hariharan, Austin, TX (US); Sathyamangalam Ramaswamy Venkatramanan, Cupertino, CA (US); Ashok Srinivasa Murthy, San Jose, CA (US); Rami El-Charif, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 79 days.

(21) Appl. No.: 17/342,391

(22) Filed: Jun. 8, 2021

(65) Prior Publication Data

US 2021/0385171 A1 Dec. 9, 2021

Related U.S. Application Data

(63) Continuation of application No. 16/513,038, filed on Jul. 16, 2019, now Pat. No. 11,032,210, which is a continuation of application No. 14/939,610, filed on Nov. 12, 2015, now Pat. No. 10,356,004, which is a continuation-in-part of application No. 14/586,814, filed on Dec. 30, 2014, now Pat. No. 10,284,487.

(60) Provisional application No. 61/984,603, filed on Apr. 25, 2014.

(51) Int. Cl.
*H04L 47/726* (2022.01)
*H04L 41/5019* (2022.01)
*H04L 67/1031* (2022.01)
*H04L 67/1012* (2022.01)

(52) U.S. Cl.
CPC ........ *H04L 47/726* (2013.01); *H04L 41/5019* (2013.01); *H04L 67/1012* (2013.01); *H04L 67/1031* (2013.01)

(58) Field of Classification Search
CPC ............... H04L 47/726; H04L 41/5019; H04L 67/1012; H04L 67/1031; H04L 67/01
See application file for complete search history.

(56) References Cited

U.S. PATENT DOCUMENTS

| 6,466,936 B1 * | 10/2002 | Ronstrom | G06F 9/505 |
| 7,720,990 B2 | 5/2010 | Shen et al. | |
| 8,001,365 B2 | 8/2011 | Rossi | |
| 8,014,290 B2 | 9/2011 | Ji | |

(Continued)

*Primary Examiner* — Esther B. Henderson
(74) *Attorney, Agent, or Firm* — Haynes and Boone, LLP

(57) ABSTRACT

A load balancer receives a sequence of requests for computing service and distributes the requests for computing service to a computing node in an ordered list of computing nodes until the computing node reaches its maximum allowable compute capability. Responsive to an indication that the computing node has reached its maximum allowable compute capability, the load balancer distributes subsequent requests for computing service to another computing node in the ordered list. If the computing node is the last computing node in the ordered list, the load balancer distributes a subsequent request for computing service to a computing node other than one of the computing nodes in the ordered list of computing nodes. If the computing node is not the last computing node in the ordered list, the load balancer distributes a subsequent request for computing service to another computing node in the ordered list of computing nodes.

20 Claims, 13 Drawing Sheets

(56) References Cited

U.S. PATENT DOCUMENTS

| | | |
|---|---|---|
| 8,346,922 B2 | 1/2013 | Chambers et al. |
| 8,812,727 B1 | 8/2014 | Sorenson, III et al. |
| 10,469,336 B2 | 11/2019 | Gould et al. |
| 2002/0116479 A1 | 8/2002 | Ishida et al. |
| 2003/0069974 A1* | 4/2003 | Lu .................. H04L 67/1001 |
| | | 718/105 |
| 2005/0022202 A1* | 1/2005 | Sannapa Reddy ...... G06F 9/505 |
| | | 718/100 |
| 2005/0114429 A1 | 5/2005 | Caccavale |
| 2007/0136303 A1 | 6/2007 | Singhai et al. |
| 2009/0024736 A1 | 1/2009 | Langille et al. |
| 2009/0281818 A1 | 11/2009 | Li et al. |
| 2010/0138510 A1 | 6/2010 | Moribayashi |
| 2011/0004656 A1* | 1/2011 | Egashira .................. G06F 9/505 |
| | | 709/224 |
| 2012/0102493 A1 | 4/2012 | Allen et al. |
| 2015/0312166 A1 | 10/2015 | El-Charif et al. |

\* cited by examiner

SOFTWARE LOAD BALANCER TO MAXIMIZE UTILIZATION

CLAIM OF PRIORITY

This application is a continuation application and claims the benefit of U.S. patent application Ser. No. 16/513,038 filed Jul. 16, 2019, which is a continuation of U.S. patent application Ser. No. 14/939,610, filed Nov. 12, 2015, issued as U.S. Pat. No. 10,356,004 on Jul. 16, 2019, which is a continuation-in-part of, and claims the benefit of, U.S. patent application Ser. No. 14/586,814, filed Dec. 30, 2014, now U.S. Pat. No. 10,284,487, issued May 7, 2019, which claims benefit of U.S. Provisional Patent Application Ser. No. 61/984,603, filed on Apr. 25, 2014. The contents of all applications are incorporated by reference herein in their entirety.

TECHNICAL FIELD

The subject matter disclosed herein generally relates to the processing of data. Specifically, the present disclosure addresses systems and methods to facilitate load balancing in the efficient use of resources to ensure adherence to SLA response times.

BACKGROUND

Large scale computing systems process work by distributing the incoming work across a set of machines running similar software. What is desired is a load balancer which may be an efficient software load balancer that will distribute the work across a minimum set of machines and reduce overall cost of performing the given work at any given time.

BRIEF DESCRIPTION OF THE DRAWINGS

Some embodiments are illustrated by way of example and not limitation in the figures of the accompanying drawings.

DETAILED DESCRIPTION

Figure 1:
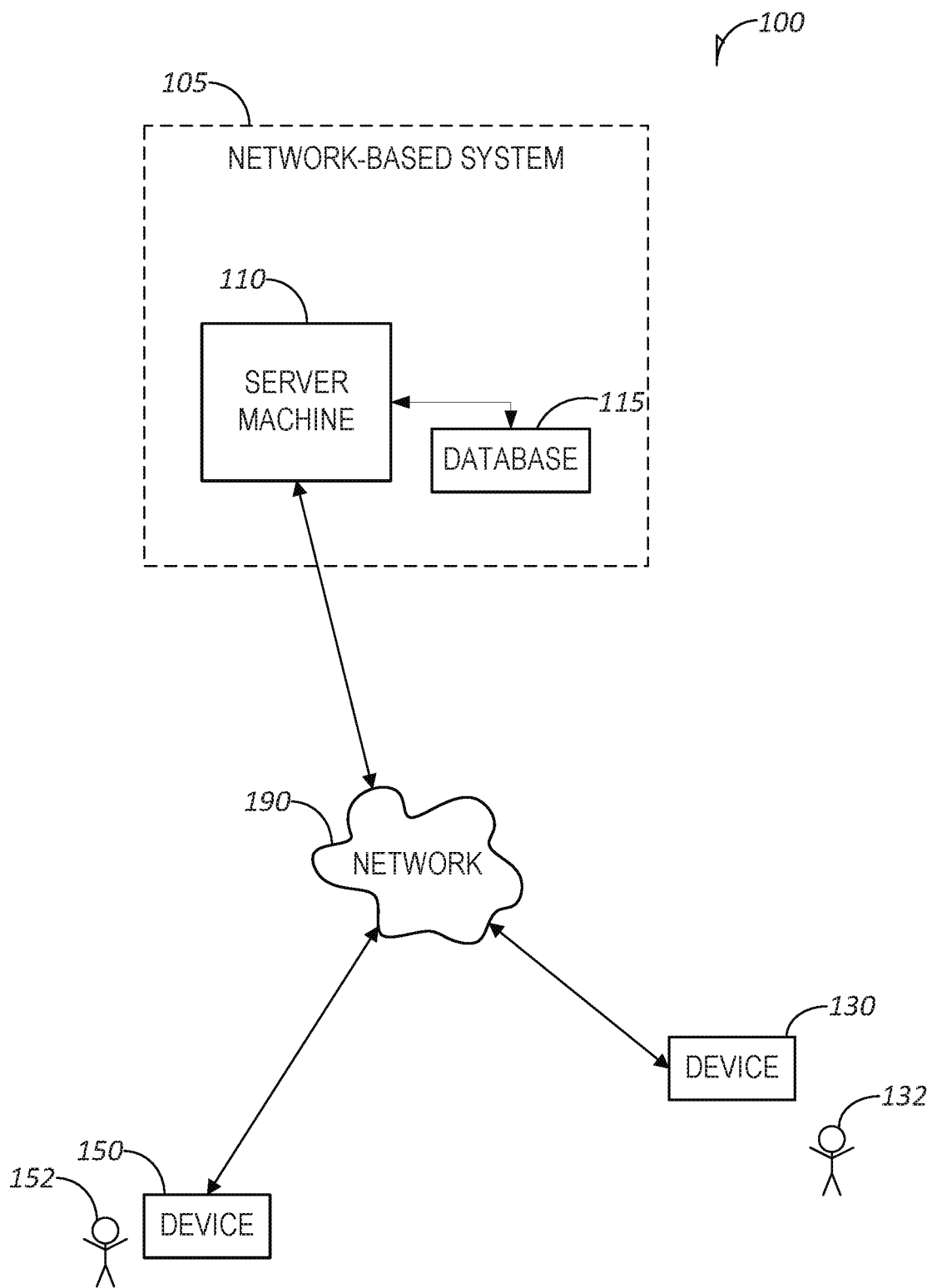
FIG. 1 is a network diagram illustrating a network environment suitable for performing data processing, according to some example embodiments.

Example methods and systems are directed to software load balancers. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Traditional load balancers use a given set of target machines to send the load to as evenly as possible among the members of the set. Different load balancing methods achieve this either by using a static load balancing method or by using some information on the state of the target machines. But this type of load balancer is not necessarily distributing the work evenly or efficiently using resources. If there are slower machines, the load balancer might give less work to the slower machines and more work to the faster machines. However, this can result in problems because of the possibility of multiple machine technologies being in the same group. Stated another way, there can be slower machines and faster machines in the set and the system will not be able to automatically distribute the load based on the need of the jobs at hand and the availability of resources or machines in the set or the capability of resources or machines in the set. This usually results in the work not being balanced among the machines in a set, with some machines operating on a large number of jobs while other, perhaps slower, machines, operating on a smaller number of jobs, yet most of the machines being engaged at all times irrespective of available work. In all cases, the total number of machines operational will be the entire set. Consequently, both power and resources are used inefficiently. Stated another way, the traditional load balancer is static, much like an appliance. The load balancer statically operates without a degree of freedom that would allow it to listen to the detailed feedback of the system being balanced, and react accordingly. Consequently, the traditional load balancer does not discard unnecessary capacity, nor does it add capacity as needed; it uses all machines in a pool at all times.

Example embodiments provide a load balancer which distributes work across each machine in a set of machines (which may be virtual machines) until each machine reaches its maximum allowable compute capability before distributing work to the next machine in the set, without impacting the user experience. This type of load balancer avoids the inefficiency problem caused by slower and faster machines in the set. For example, if the system comprises a set of ten machines, the number of machines needed to perform the work at hand at a given time might just be three. The load balancer distributes the work to each machine until that machine reaches its maximum, and then begins distributing work to the next machine, and so on. The result, in this example, would be that three machines would be used for the work. The other seven could be used for other system work or could be powered down as desired in order to conserve power. This is achieved by a dynamic software load balancer in which the usual service level agreement (SLA) determines an expected response time, and feedback from the machines determines, or enables the load balancer to determine, how many jobs are pushed to the minimum number of machines in the set of machines to do the work.

Every machine that is load balanced in the set may have local management software (sometimes called a management system) that is used to manage application software on that machine. When a new version of an application is deployed, the management system brings the local management software up and then may start a load balancer agent, if an agent is present. The agent then communicates with the load balancer for registering itself as ready to receive traffic. The overall system also provides that a node, (e.g., machine) trying to register is valid and part of a pool that is authorized to receive work. After this, the node starts receiving work from the load balancer when it is needed. The load balancer will continue sending traffic to the node until it reaches resource saturation, or until an SLA can be met, at that point the load balancer does not send any new work until the node has finished with some of the work it already has. When there is not enough work to give to this node, it is released from the load balancer and can be reclaimed, or can remain idle until it is needed again. In practice the machines can function with or without the agent.

The load balancer will look at all the machines registered for a given function and will start traffic to those machines, using some order it determines randomly. As the load balancer sends traffic to a machine, it will receive feedback from that machine that tells the load balancer how much more work the machine can accept that can be completed within the specified SLA. The load balancer continues to send traffic to that machine until it is saturated. Once that occurs, the load balancer starts sending traffic to the next machine in the group and so on. When the incoming traffic starts slowing down, the machine with least work in progress is idled and potentially released if the load balancer does not have enough traffic to send.

An overall management control plan may look at the entire system holistically and decide whether it needs to add more capacity to a given pool. The decision may be based on traffic patterns and system behavior. If the amount of work goes down below a threshold and a lot of machines become idle, the management control plan can reclaim these idle machines and use them for other work or simply turn them off to conserve power.

FIG. 1 is a network diagram illustrating a network environment 100 suitable for software load balancers, according to some example embodiments. The network environment 100 includes a server machine 110, a database 115 connected to server machine 110, and devices 130 and 150, all communicatively coupled to each other via a network 190. The server machine 110 may form all or part of a network-based system 105 (e.g., a cloud-based server system configured to provide one or more services to the devices 130 and 150). The server machine 110 and the devices 130 and 150 may each be implemented in a computer system, in whole or in part, as described below with respect to FIG. 12.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132, or which the user has access to. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152, or which the user has access to.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 12. As used herein, a "database" is a data storage resource, which operates in accordance with storage module 230 and is accessed via access module 210, to store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
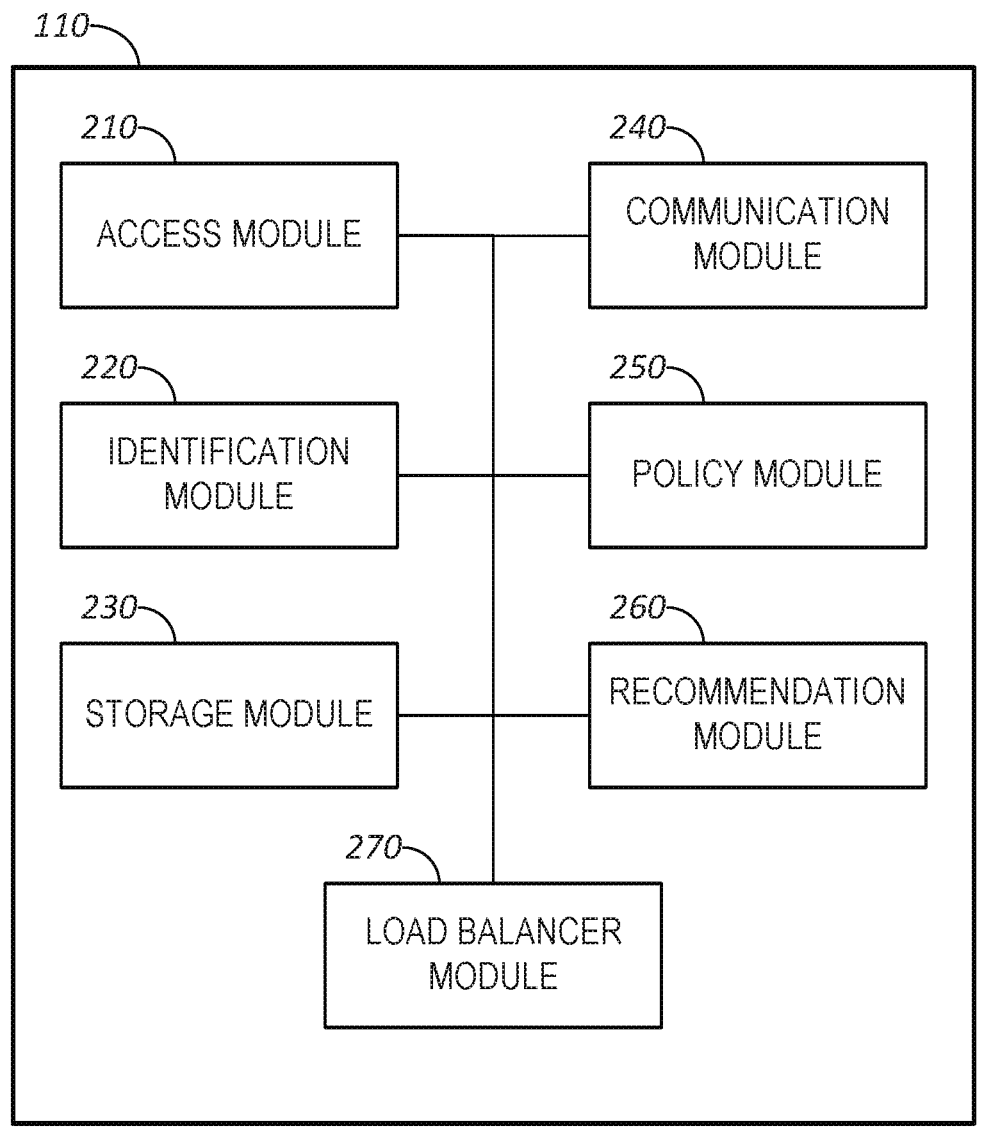
FIG. 2 is a block diagram illustrating components of a server machine suitable for work load balancing in a network environment, according to some example embodiments.

FIG. 2 is a block diagram illustrating components of the server machine 110, according to some example embodiments. The server machine 110 is shown as including access module 210, identification module 220, storage module 230, a communication module 240, policy module 250, recommendation module 260, and load balancer module 270, all configured to communicate with each other (e.g., via a bus, shared memory, or a switch). In one embodiment, load balancer module 270 may be part of a separate server machine, and configured to communicate with modules 210-260 (i.e., load balancer 270 is outside of server machine 110, implemented in a separate server machine or computing device). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. In particular, the load balancer module 270 performs the data flow described with respect to the flowchart of FIG. 4. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
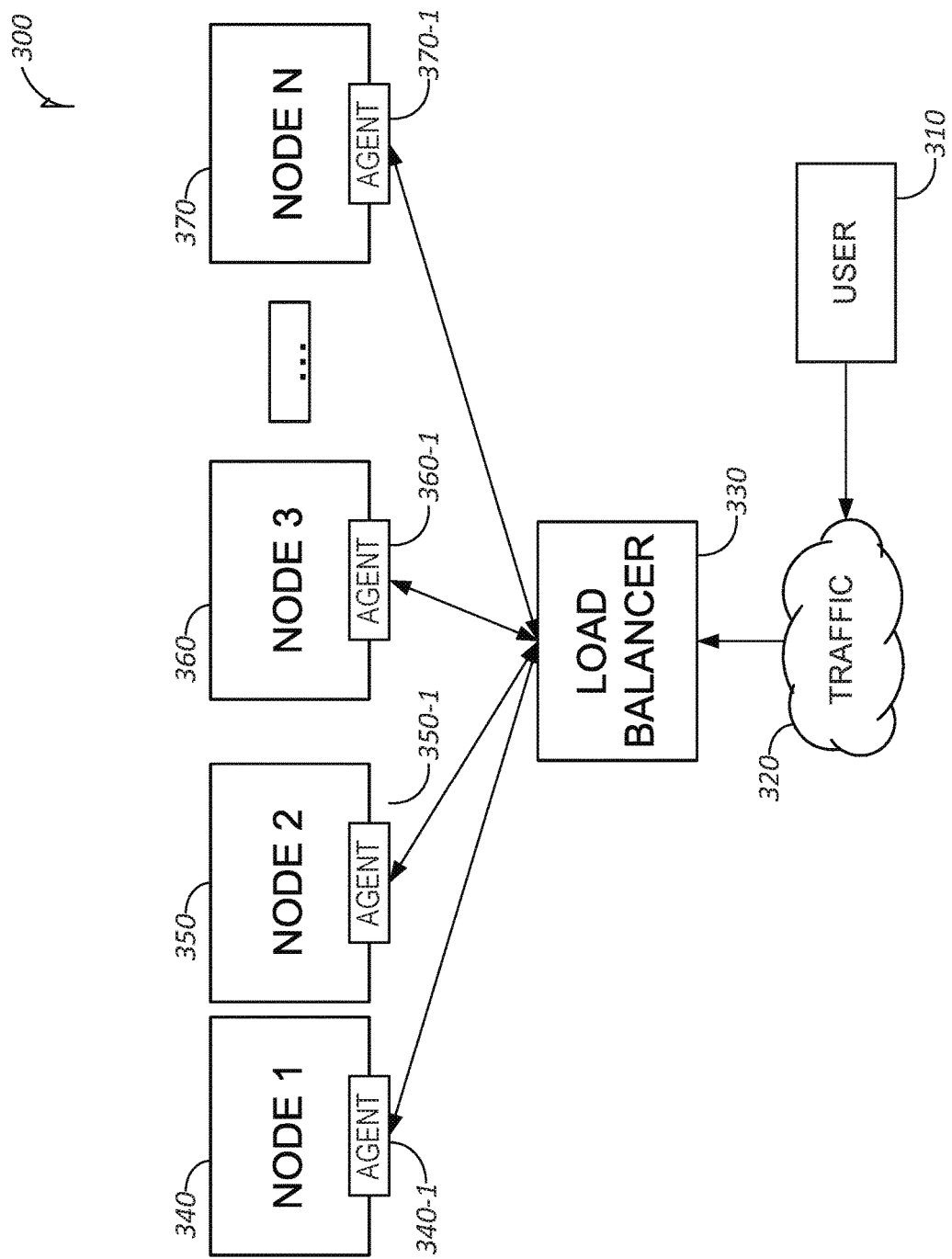
FIG. 3 is a block diagram illustrating components of a device suitable for a workload balancer, according to some example embodiments.

FIG. 3 is a block diagram illustrating components of a device suitable for a workload balancer, according to some example embodiments. As seen in FIG. 3, a system 300, which may be the network-based system 105 of FIG. 1, comprises a number of computer nodes 340, 350, 360, . . . , 370 each comprising a respective computer machine, and each respectively representing computer nodes which may be referred to as Node 1, Node 2, Node 3, . . . , Node N of FIG. 3. Associated with each node may be a load balancer agent such as 340-1, 350-1, 360-1, . . . , 370-1 of nodes 340, 350, 360, . . . , 370. Load balancer 330, which in some embodiments is software such as load balancer module 270 of FIG. 2, interfaces with each node, in one embodiment, agents 340-1, 350-1, 360-1, . . . , 370-1 in order to communicate with each node via communication module 240 of FIG. 2. As discussed briefly above, when a new version of an application is deployed, the management system 300 brings the new version of the application up and then starts a load balancer agent such as agents 340-1, 350-1, 360-1, . . . , 370-1 of nodes 340, 350, 360, . . . , 370, respectfully. The system 300 also provides, via identification module 220, that the node trying to register is valid and part of a pool that is authorized to receive work by, inter alia, checking node address, machine configuration, and application version numbers. Identification module 220 communicates with policy module 250 that addresses security risks by implementing additional authentication. The agent then communicates via communication module 240 of FIG. 2 with the load balancer 330 for registering itself as ready to receive traffic. As mentioned, the load balancer 330 may operate with or without agents. Operation of the load balancer 330 is described in additional detail below. With continued reference to FIG. 3, user 310 communicates with system 300 over the network 320 (which may the same as network 190 of FIG. 1). When a user communicates with system 300, policy module 250 provides security by such actions as verifying that a requested certificate is for a specific user and for a specific purpose, and it can enforce whether to deploy a user certificate or computer certificate. The load balancer 330 interfaces with network 320 via a network interface of system 300.

Figure 4:
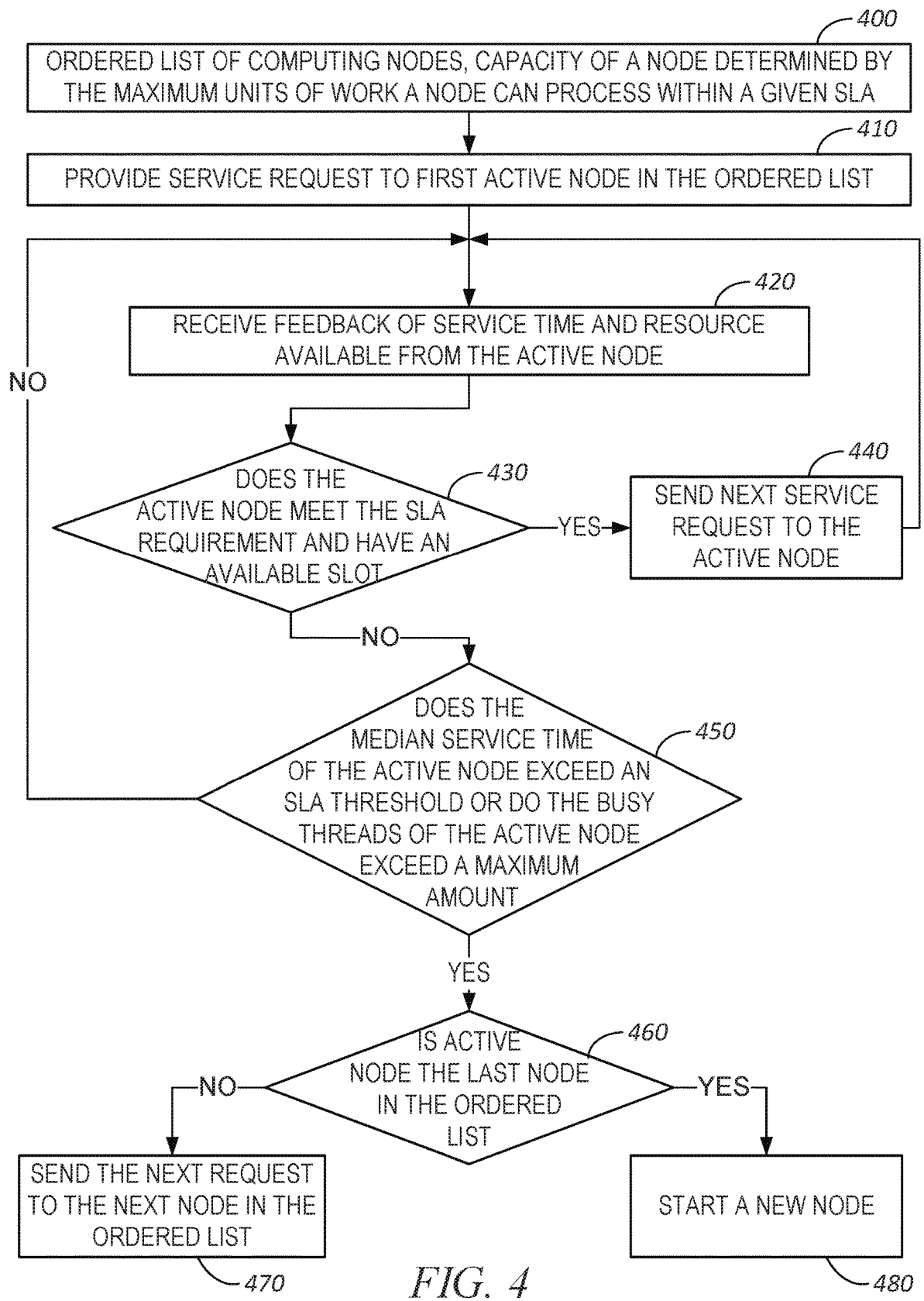
FIG. 4 is a flowchart illustrating data flows within the network environment suitable for load balancing, according to some example embodiments.

FIG. 4 is a flowchart illustrating data flows within the network environment suitable for load balancing, according to some example embodiments. The method of the flowchart of FIG. 4 begins with an ordered list of computing nodes such as nodes 340, 350, 360, . . . , 370 of FIG. 3 that are configured for system processing in operation 400. As discussed above, the capacity of a given node may be determined by the maximum units of work that a node can process to be within the requirements of the SLA of the given node. Operations in the method 400 may be performed using modules described above with respect to FIG. 2 as more fully discussed below.

As shown in FIG. 4, the method 400 includes operations 400, 410, 420, 430, 440, 450, 460, and 470. As a service request arrives to the load balancer module 270 of FIG. 2, via communication module 240 of FIG. 2, from a user 310, load balancer module 270 of FIG. 2 provides the service request to the first node in the ordered list for processing at operation 410 of FIG. 4. The load balancer module 270 communicates with the nodes 340, 350, 360, . . . , 370 by communication buses via a network, such as network 190, via access module 210 of FIG. 2, and receives feedback of service and resource availability from the node that is active at operation 420.

Based on the feedback, certain decisions may be made. As seen at operation 430 a determination is made, by load balancer module 270 interacting with access module 210 to address the active node, as to whether the active node both meets the SLA requirement and has an available processing slot (e.g., whether the number of connections to the active node is less than the maximum number of connections for the node). If the answer is YES, (i.e., the YES decision is taken), then the load balancer module 270 sends the next service request to the currently active node at operation 440 via communication module 220 of FIG. 2. Additionally, the maximum number of connections for the node may be incremented by one, to allow another request to be routed to the active node at a later time. If the NO decision is taken at operation 430, then a test is performed at operation 450 by load balancer module 270 of FIG. 2 to determine whether the average service time of the active node exceeds an SLA threshold or whether busy threads of the active node exceed a maximum amount. The maximum amount may be determined by the system designer in accordance with the needs of the particular system. In one embodiment, if the NO decision is taken at operation 430, then the maximum amount of connections for the node may be decremented by one, such that future requests are not routed to that node. In one embodiment, if a No decision is taken at operation 430, a degraded mode of operation may be utilized, if the current node is the last node in an ordered list to be checked. Degraded mode is explained further herein.

If a NO decision is taken at operation 450, the system continues back to operation 420 to receive feedback from the active node for a number of times for either the YES decision to be taken at operation 450 or the YES decision to be taken at test operation 430, described below. The system designer may set a time-out period whereby if either the YES decision at operation 430 or the YES decision at operation 450 is not reached during the time-out period, load balance module 270 issues an alert indicting an abnormal condition is generated.

If the YES decision is taken at step 430, this indicates that the active node is operating with the desired SLA requirement and does have an available processing slot. Consequently, as at operation 440, the load balancer module 270 sends the next service request to the active node.

If the YES decision is taken at test operation 450, the active node is not in condition to receive another service request and another node should be initiated. At test operation 460, a determination is made by load balancer module 270 as to whether the active node is the last node in the ordered list. If the NO decision is taken, then load balancer module 270 sends the next service request to the next node in the ordered list in operation 470. If the YES decision is taken, that means that all nodes in the ordered list are operating at maximum capacity, and a new node should be brought online and added to the ordered list in operation 480.

Figure 4A:
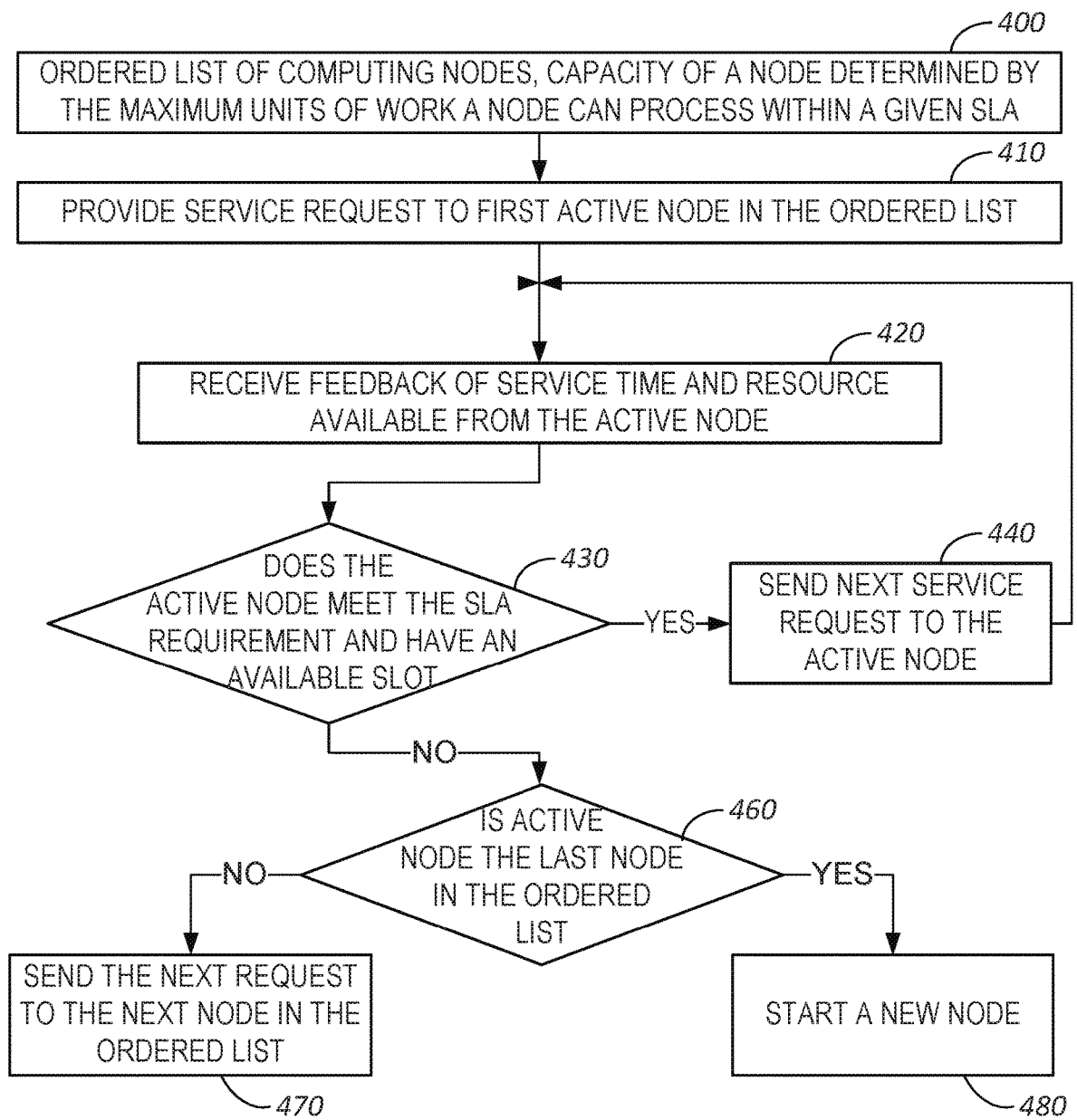
FIG. 4A is a further flowchart illustrating data flows within the network environment suitable for load balancing, according to some example embodiments.

In one embodiment, method 400 may not include a determination as described above with respect to operation 450. In such an embodiment, after a NO decision is taken at operation 430, the method proceeds directly to operation 460. Such a method 400 is depicted in FIG. 4A.

One or more of operations 400-450 may be performed as part (e.g., a precursor task, a subroutine, or a portion) of operation 460.

In one embodiment, the maximum number of connections for a node may be incremented, decremented, or kept the same, based on the deviation of the response time from the SLA, after a transaction is processed or completed. Thus, in one embodiment, after the completion of a transaction, information including the maximum number of connections, current number of connections, and processor utilization over a certain time period may be transmitted to the load balancer. The load balancer, or a load balancer agent or daemon for each node (which may be executing on individual nodes), may use that information to determine whether to change the maximum number of connections value for the node.

For example, in one embodiment, the load balancer agent or daemon for the node may determine whether the deviation of the response time from the SLA exceeds a threshold to take early action, and may decrease the maximum number of connections for that node, which information is then transmitted to the load balancer. Additionally, the load balancer agent or daemon for the node may determine whether the deviation of the response time from the SLA is less than the inverse of the threshold to take early action, and may increase the maximum number of connections for that node, which information is then transmitted to the load balancer. An early action threshold may be used when the number of connections to the node does not equal the maximum number of connections to the node. In one embodiment, the threshold is the product of the SLA multiplied by a fraction particular to the application executed by the nodes. These operations performed by the load balancer agent or daemon may determine a score for the transaction, which ultimately results in the adjustment to the maximum number of connections variable used by the load balancer.

Similarly, the load balancer agent or daemon for the node may determine that the accumulated deviation of the response time from the SLA exceeds a threshold to take regular action, and may decrease the maximum number of connections for that node, which information is then transmitted to the load balancer. Additionally, the load balancer module or daemon for the node may determine whether the accumulated deviation of the response time from the SLA is less than the inverse of the threshold to take regular action, and may increase the maximum number of connections for that node, which information is then transmitted to the load balancer. A regular action threshold may be used when the number of current connections to the node equals the maximum number of connections to the node. As above, these operations performed by the load balancer agent or daemon may determine a score for the transaction, which ultimately results in the adjustment to the maximum number of connections variable used by the load balancer.

In one embodiment, certain decisions made as part of operations of method 400 may be modified to allow nodes to take burst traffic. For example, in some implementations of method 400, burst traffic may cause the load balancer to go into a round robin mode. Round robin mode will prevent starting a new node for temporary traffic bursts even if current nodes have not met the SLA. Accordingly, in one embodiment, a low watermark buffer equal to half of the number of current connections below the amount of maximum connections, below which the maximum connections amount will not be reduced may be provided to accommodate bursts after prolonged low traffic periods. Similarly, a high watermark buffer equal to half the number of current connections above the amount of maximum connections, above which the maximum connections amount will not be increased, may be provided to prevent a misbehaving node or node encountering error conditions because of faulty software or other operating conditions which affect all transactions. Thus, in such an embodiment, an operating range for the maximum number of connections may be provided, in which the maximum number of connections may vary depending on the number of current connections, so that bursts can be handled.

In one embodiment, the load balancer may be configured to deal with multiple types of service requests, which, in one example, are characterized by a service request URL. In such an embodiment, multiple accumulators may be provided, one for each set of service request URLs. Each accumulator is updated after a transaction response occurs with a normalization of the difference between the response time for the transaction and the service level agreement for that type of transaction. The accumulator value calculated after each transaction response may be used as feedback to the load balancer, by using the accumulator value to update the maximum number of connections variable for a particular node. Thus, as a service request arrives to the load balancer, the load balancer may pool a number of related transactions together, and distribute those pooled transactions to one or more nodes. Pooling transactions in this manner may take advantage of caching built up by related transactions.

In one embodiment, transactions that may be grouped include those transactions with a higher frequency, but lower response time requirements. Similarly, transactions that may be grouped are lower in frequency but higher in response times. This may ensure the least amount of unused resources when a given node processes elongated transactions of a certain type in a group of transactions.

In one embodiment, grouping transactions (or URLs) may include calculating the product of the service level agreement, multiplied by the frequency of execution for each transaction. From these calculated products, the natural separation of the products may be identified to identify groups. Transactions represented by the calculated products may be clustered into those groups. For each group of transactions or URLs, an accumulator is allocated to accumulate the gain and loss of service times, with respect to the service level agreement.

The sum of such gain or loss of service time may represent a total work amount that can be processed at a given time by processing units available in a node. In one embodiment, the number of processing units plus the common queue length that can be accommodated for the expected service time of the given transactions is the maximum number of active connections that may be allowed on the node. Connections may then be proportionately divided into the number of accumulators formed by the identified groups of transactions.

Thus, in one embodiment, incoming transactions may be routed to an appropriate load balancer module for the transaction type of the incoming transaction. The load balancer module includes an accumulator, which may be recalculated upon the completion of each transaction leaving the node. That is, as any transaction leaves a node, one accumulator value may be calculated. During the computation of the gain or loss in transaction service time, the transaction service time may be compared to the service level agreement of the transaction's type. The output of any accumulator changing the maximum number of connections may be transmitted to the load balancer.

In one embodiment, a combination of the above techniques may be utilized for the load balancer. Thus, a single load balancer process may be employed which operates in connection with a front end process. The front end process may determine to which group a given incoming request belongs, and thus which group load balancer module should process the incoming request. Each group load balancer module may maintain its own set of accumulators, with one accumulator per node. The individual group load balancer modules do not interact with other such modules. For each group, the service level agreement or response time expectation may be different from that of other groups, and thus the configurations maintained by the group load balancer modules are different. Each group load balancer module may operate as a load balancer according to the above description of handling burst traffic, that is, a load balancer that recalculates the maximum number of connections with a buffer. All group load balancer modules may connect to the same set of nodes executing the same application.

Figure 5:
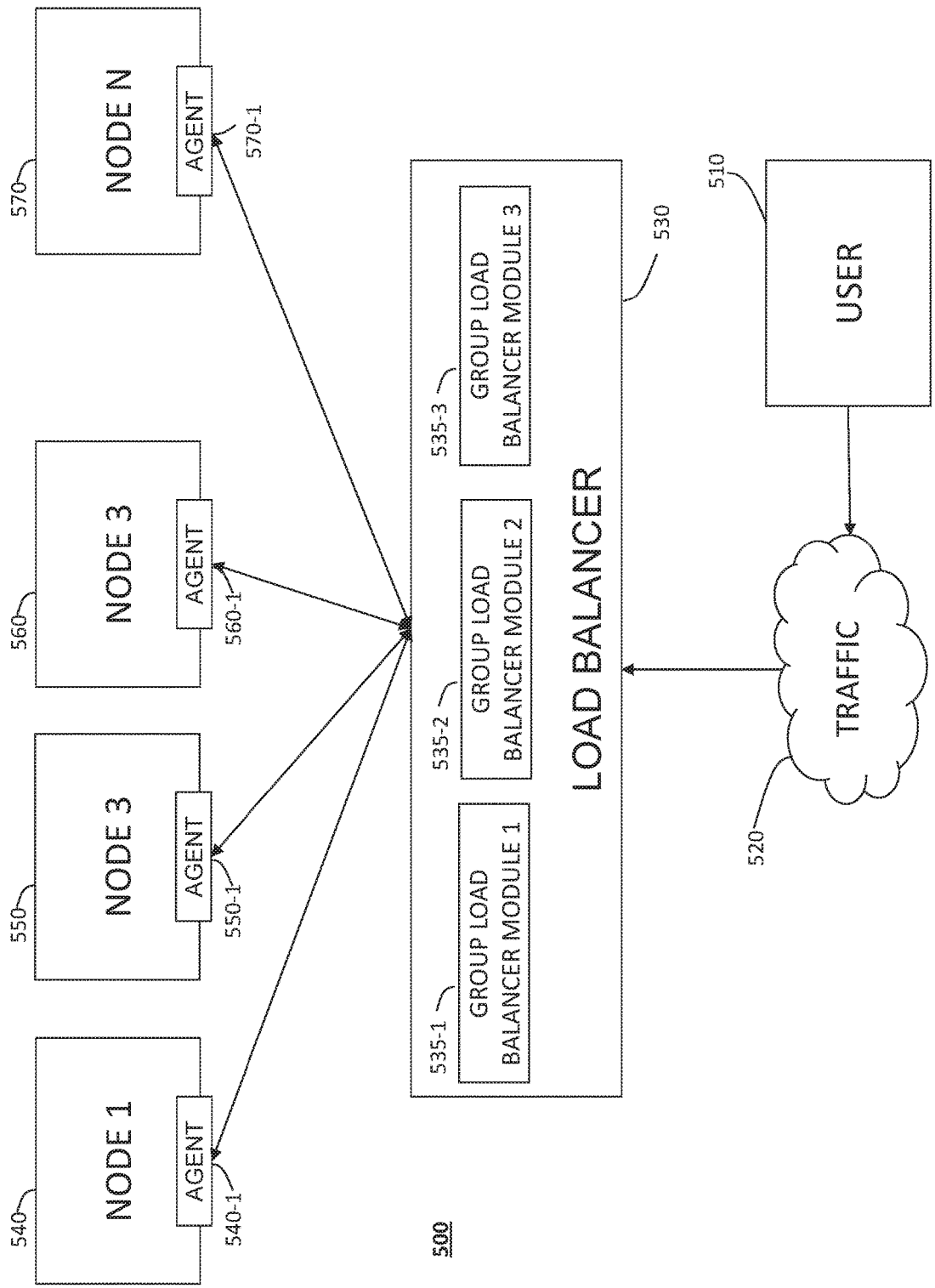
FIG. 5 is a block diagram illustrating components of a device suitable for a workload balancer with a plurality of group load balancer modules, according to some example embodiments.

FIG. 5 is a block diagram illustrating components of a device suitable for a workload balancer with a plurality of group load balancer modules, according to some example embodiments. FIG. 5 is similar in some respects to the block diagram of FIG. 3. As seen in FIG. 5, a system 500, which may be the network-based system 105 of FIG. 1, comprises a number of computer nodes 540, 550, 560, . . . , 570 each comprising a respective computer machine, and each respectively representing computer nodes which may be referred to as Node 1, Node 2, Node 3, . . . , Node N of FIG. 5. Associated with each node may be a load balancer agent such as 540-1, 550-1, 560-1, . . . , 570-1 of nodes 540, 550, 560, . . . , 570. In some implementation, the functionality of the agents 540-1, 550-1, 560-1, . . . , 570-1 is included load balancer itself, and each node is not associated with its own load balancer agent. Load balancer 530, which in some embodiments is software such as load balancer module 270 of FIG. 2, interfaces with each node, in one embodiment, agents 540-1, 550-1, 560-1, . . . , 570-1 in order to communicate with each node via communication module 240 of FIG. 2. Load balancer 530 further includes one or more group load balancer modules 535-1, 535-2, 535-3. Three group load balancer modules are depicted in FIG. 5, though more or fewer may be present. Group load balancer modules interface with each node 540, 550, 560, . . . , 570, and in some embodiments, agents 540-1, 550-1, 560-1, . . . , 570-1 in order to communicate with each node via communication module 240 of FIG. 2. Each group load balancer module 535 may maintain a set of accumulator values, corresponding to the nodes it is communicating with, for transactions processed by that group. Operation of the load balancer 530 and group load balancer modules 535-1, 535-2, 535-3 is described in additional detail below. With continued reference to FIG. 5, user 510 communicates with system 500 over the network 520 (which may the same as network 190 of FIG. 1). When a user communicates with system 500, policy module 250 provides security by such actions as verifying that a requested certificate is for a specific user and for a specific purpose, and it can enforce whether to deploy a user certificate or computer certificate. The load balancer 530 interfaces with network 520 via a network interface of system 500.

In one embodiment, commands are grouped by identifying similar commands based on the distribution of their service level agreement needs or response times. This may be performed, in one embodiment, by collecting data from logs of current or previous transactions. Because transaction volume may vary based on the time of day, commands may be grouped on a periodic basis. For example, commands may be grouped for every 15 minutes during a day, or other time period. In one embodiment, a traffic pattern that replicates periodically may be used to perform traffic analysis. For example, traffic patterns may replicate on a weekly basis. Accordingly, grouping and traffic analysis for a 15-minute period during a particular week may be used to determine command groups for the same 15-minute period the next week.

In one embodiment, commands are grouped based on the classification of commands using clustering analysis. In one embodiment, k-means clustering is used, although other clustering techniques are possible as well. Clustering may be used, in one embodiment, to limit the number of types or classes of transactions to a number that can be determined, depending on available resources. That is, commands can be clustered into many or few clusters, and an appropriate number of group load balancer modules may be provided. In one embodiment, the response time median for the given command, and the $95^{th}$ percentile response time for the command may be used as the dimensions for the clustering analysis. In one embodiment, the $95^{th}$ percentile response time for the command may be approximately two times the average response time value. Thus, in one example embodiment, a starting point for centroids of the clusters may be the response time median and two times the average response time.

To determine the number of groups to classify commands into (i.e., the value of "k" in a k-means analysis), peaks in response time distribution graph may be identified. Thus, the number of peaks in a response time distribution graph may be used as the "k" value to classify the commands into. In some instances, response time peaks may be the result of values from multiple commands. In such instances, when it is determined that such a peak is not the result of a high number of values from a single command, the number of groups may be reduced by one.

In one embodiment, the centroids are the points around which a response time distribution occurs. Thus, a k-means algorithm may use the identified centroids as the "k" number of groups. Each command, based on its response time, is categorized or assigned into one of the "k" groups based upon which group's response time the command's response time is closest to. As explained above, the number of groups and categorization of the commands into those groups may be recalculated for each time period (e.g., 15 minute time period) per week or other length of time.

Thus, as described above, a single load balancer 530 may be employed which operates in connection with a front end process. The front end process may determine to which group a given incoming request belongs, and thus which group load balancer module 535-1, 535-2, 535-3, should process the incoming request. In one embodiment, the number of load balancer modules is the number of "k" clusters. Thus, in the example of FIG. 5, "k" may be determined to be three. Requests may be sent to the first node that permits an additional connection for the group the request belongs to. Accordingly, nodes which are started early should receive the most traffic.

For normal routing, when a request is received, the request is initially assigned to the first active node. A determination is made as to whether the number of connections for the first active node is less than the maximum number of connections for that node. If that determination results in a yes, the request is routed to that node. If that determination results in a no, the next active node should be checked. If all active nodes have been checked and the request cannot be routed, then the routing process may proceed to a degraded state, described below. Otherwise, the number of connections for the next active node is evaluated against the maximum number of connections for that node, until the request is routed, or until the routing process proceeds to a degraded state. A method of routing requests as described is shown with more detail in FIG. 6, which, in certain operations, is similar to the method outlined in FIG. 4.

Figure 6:
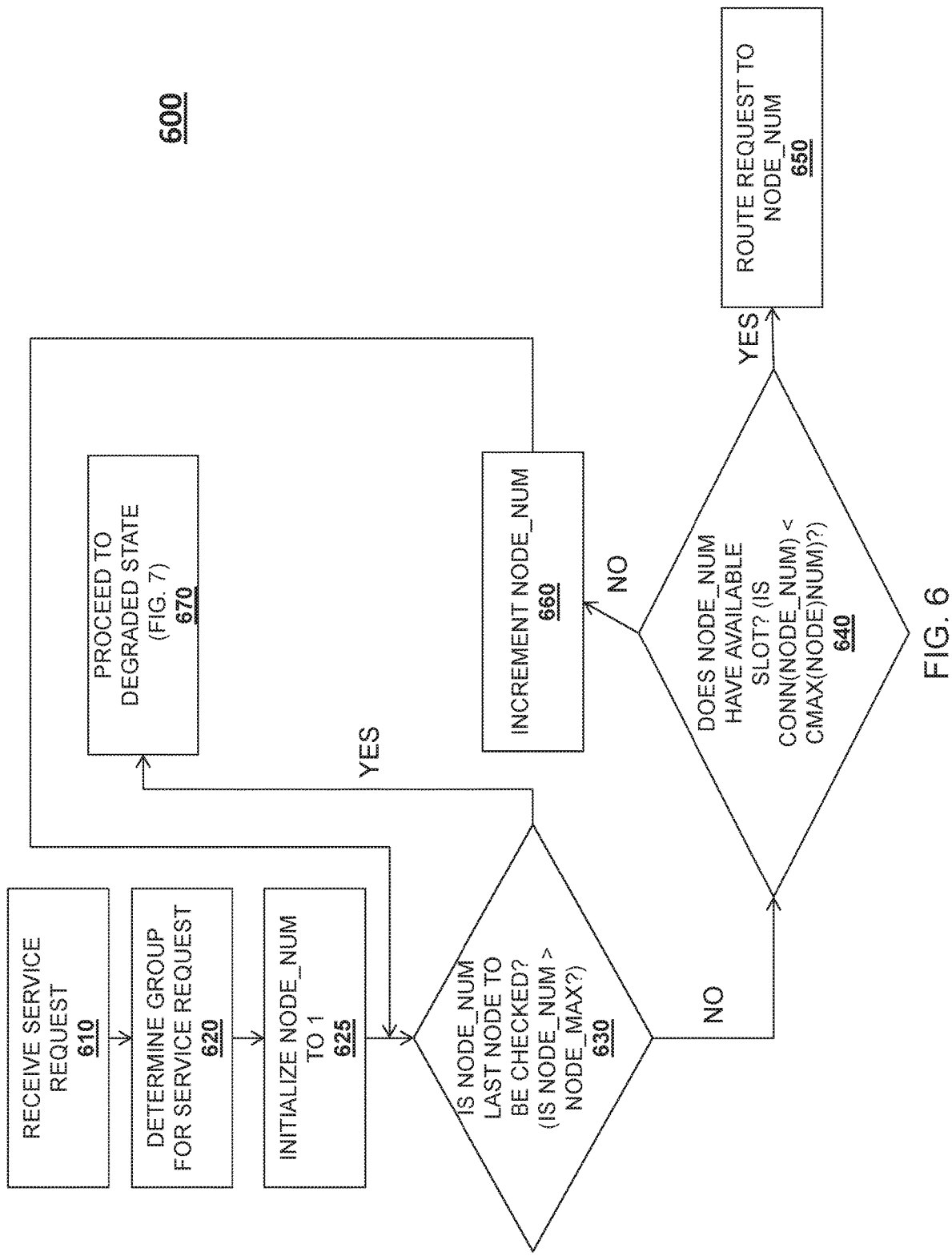
FIG. 6 is a flowchart illustrating a method of routing requests, according to some example embodiments.

Method 600 of FIG. 6 begins at operation 610, where a service request is received by load balancer 530, for example, from a user 510 over network 520. At operation 620, the load balancer 530 may determine an appropriate group and thus an appropriate group load balancer module 535-1, 535-2, 535-3, for the service request, based, for example, on the expected response time or service level agreement for the particular type of request. Thus, as described above, the load balancer 530 may determine that a group load balancer module 535-1 for group 1 is appropriate for the received request.

At operation 625, a numeral identifier value for a node to be checked is set to 1. The numeral identifier value identifies the node (which may be the first node in an ordered list) which is checked to determine whether the node has availability to process the request. At operation 630, a group load balancer module (e.g., group load balancer module 535-1) proceeds to attempt to route the request by starting at the first computing node, for example, the first computing node in an ordered list. In one embodiment, the group software load balancer module 535 performs a comparison against a numeral identifier variable for the node to be checked (e.g., for the first node a numeral identifier variable of "1") against a maximum number of nodes variable (e.g., "5", if there are five available nodes). If the variable for the first node is less than the maximum number of nodes variable, method 600 proceeds to operation 640.

At operation 640, the number of connections for the first node or the node to be checked (denoted as "Conn," or written as functional notation, "CONN(NODE_NUM)") is evaluated against the maximum number of connections for the first node (denoted as "CMax", or written as functional notation, "CMAX(NODE_NUM)") to determine whether the first node has an available slot to process the request. If the number of connections for the first node is less than the maximum number of connections for the first node, method 600 proceeds to operation 650, and the request is routed to the first node. The first node may then process the request. If the number of connections for the first node is equal to or greater than the maximum number of connections for the first node, method 600 proceeds to operation 660, which increments the numeral identifier variable for the node to be checked (e.g., incrementing the numeral identifier variable for the node to be checked to "2"). Method 600 then returns back to operation 630, and the operations repeat until the request is routed.

Figure 7:
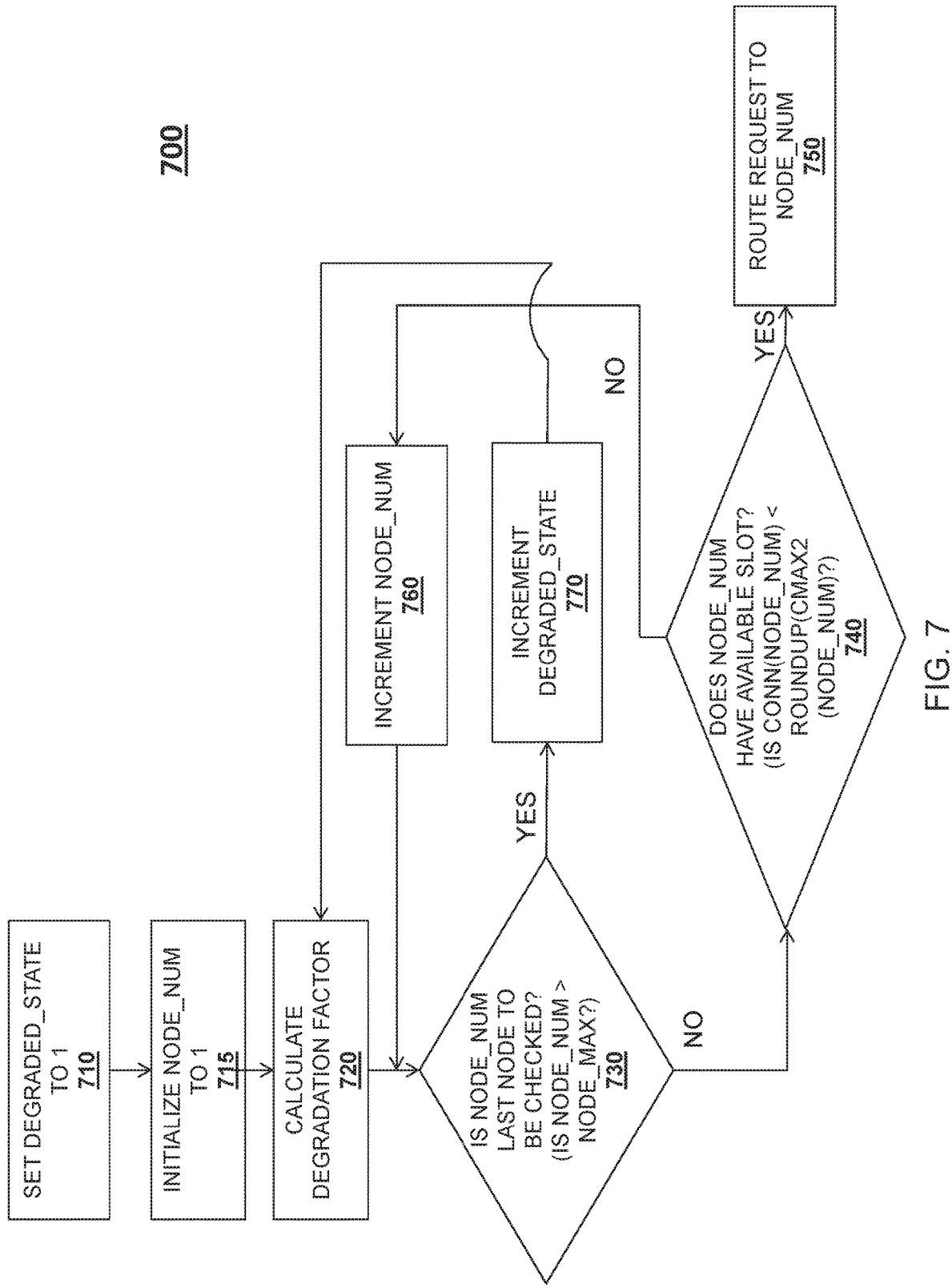
FIG. 7 is a flowchart illustrating a method of routing requests in a degraded state, according to some example embodiments.

If, at operation 630, the numeral identifier variable for the node to be checked exceeds the maximum number of nodes variable (which may occur if no individual node has an available connection), method 600 proceeds to operation 670, the degraded state of operation, which is described in more detail in FIG. 7.

If a request cannot be routed according to the operations of method 600 (for example, if additional capacity or nodes are not immediately added, or because temporary traffic bursts do not warrant new capacity), the load balancer may enter a degraded state, in which performance on a group of commands is degraded from the target SLA. In one embodiment, the performance on the group of commands is gradually degraded until performance can be returned to a target service level agreement. In one embodiment, performance is reverted back to a target service level agreement or response time expectation as soon as possible. The degraded state is entered when no node can process the current request according to the target SLA. The operation of the degraded state is described with reference to method 700 of FIG. 7, which, in one embodiment, is performed by a group load balancer module 535.

Method 700 begins at operation 710, where a degraded state variable is set to an initial value of one. At operation 715, a numeral identifier value for a node to be checked is set to 1. The numeral identifier value identifies the node which is checked to determine whether the node has availability to process the request. Method 700 then proceeds to operation 720, where a degradation factor variable is calculated to be the difference between the degraded state variable minus one, times a factor of 0.1 (representing a 10% degradation of the target service level agreement or response time expectation). Method 700 then proceeds to operation 730, where, similar to operation 630, a group load balancer module 535 may attempt to route the request by starting at the first computing node, and performing a comparison against the numeral identifier variable for the node to be checked against the maximum number of nodes variable (e.g., "5", if there are five available nodes). If the variable for the node to be checked is less than the maximum number of nodes variable, method 700 proceeds to operation 740. At operation 740, similar to operation 640, the number of active connections for the first node (or the current node to be checked) is evaluated to determine whether the request may be routed to the first node. In operation 740, however, the number of active connections to the first node is evaluated against a degraded state maximum number of connections for the first node (denoted as "Cmax2"), i.e. Cmax multiplied by the degradation factor variable, rounded up to the next integer. If the comparison at operation 740 results in a YES value, method 700 proceeds to operation 750, and the request is routed to the first node or the node being checked. In one embodiment, the degradation factor variable is reset, as the next request may be serviced within a normal (i.e., non-degraded) service level agreement, as nodes finish processing earlier requests. If the comparison at operation 740 results in a NO value, method 700 proceeds to operation 760, where the numeral identifier for the node to be checked is incremented so as to check the next available node in the list, and method 700 returns to operation 730.

If, at operation 730, the numeral identifier variable for the node to be checked exceeds the maximum number of nodes variable (which may occur if no individual node has an available connection to service the request with one level of degradation), method 700 proceeds to operation 770. At operation 770, the degraded state variable is incremented by one. Method 700 then proceeds again to operation 720, where the degradation factor variable is recalculated, and operations 730, 740, and 760 repeat, until the request is successfully routed at operation 750.

Figure 8:
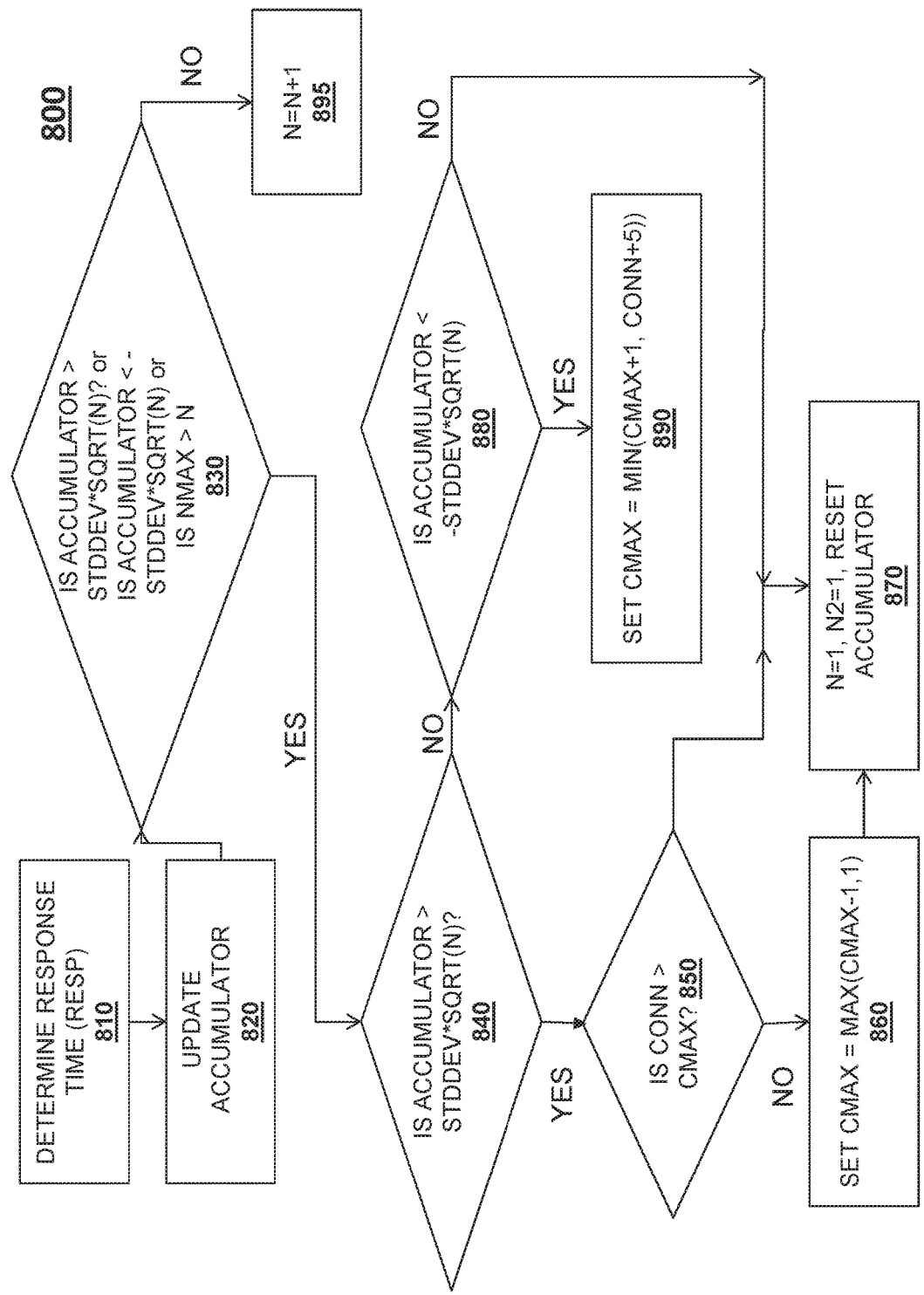
FIG. 8 is a flowchart illustrating a method of updating a maximum number of connections for a node, according to some example embodiments.

After a request is routed, and after the request is processed or responded to, the maximum number of connections for the node may be updated to the maximum number of connections in a non-degraded state (i.e., the CMax value). A flowchart of a method 800 for updating the maximum number of connections for a node is depicted in FIG. 8. Method 800 may be performed by, in one embodiment, an agent 540-1, 550-1, 560-1 . . . 570-1, or by a group load balancer module 535-1, 535-2, 535-3. At operation 810 of method 800, the response time for the request is determined (denoted as "Resp"). An accumulator variable or value for the node is then increased by the difference between the response time for the request (RESP) and the median service level agreement for the request type at operation 820. In some implementations, operation 820 may result in a decrease in the accumulator value if the response time of the request (RESP) is less than the service level agreement for that request type. At operation 830, a determination is made, based on three separate factors. If the result of any of the factors is a positive determination, method 800 proceeds to operation 840. First, at operation 830, if the accumulator value is greater than the standard deviation of the response time (e.g., the difference between the response time and the mean response time) multiplied by the square root of the number of transactions which resulted in the accumulator value, method 800 proceeds to operation 840. Second, at operation 830, if the accumulator value is less than the opposite of the standard deviation multiplied by the square root of the number of transactions which resulted in the accumulator value, method 800 proceeds to operation 840. Third, if the current request number (N) is less than the number of requests being accumulated, method 800 proceeds to operation 840.

At operation 840, a determination is made as to whether the accumulator value is greater than the standard deviation of the response time multiplied by the square root of the number of transactions which resulted in the accumulator value. If so, method 800 proceeds to operation 850. At operation 850, a determination is made as to whether the number of connections to the node ("CONN") exceeds the maximum number of connections for the node ("CMAX"). If operation 850 results in a NO, method 800 proceeds to operation 860, where the maximum number of connections is set to the maximum of: the maximum number of connections minus one, and one. Method 800 then proceeds to operation 870, where the accumulator value is reset for accumulating new response time differences. In one embodiment, the accumulator value is reset, along with a count of the number of transactions which resulted in the accumulator value ("N"), and a count of the number of transactions which resulted in the accumulator value which occurred in the degraded state ("N2"). If operation 840 results in a YES, method 800 proceeds directly to operation 870, where the number of transactions is reset, and only the accumulator value is reset.

At operation 840, if the accumulator value is not greater than the standard deviation of the response time multiplied by the square root of the number of transactions which resulted in the accumulator value, method 800 proceeds to operation 880. At operation 880, a determination is made based on whether the accumulator value is less than the opposite of the standard deviation multiplied by the square root of the number of transactions which resulted in the accumulator value. If operation 880 results in a YES, method 800 proceeds to operation 890, where the maximum number of connections is set to the minimum of the current maximum number of connections plus one, or the current number of connections plus five. If operation 880 results in a NO, then the third condition at operation 830 exists; specifically, the maximum number of connections to the node does not exceed the number of connections to the node, and therefore method 800 proceeds to operation 870, where the accumulator value is reset.

If, at operation 830, all three factors result in a NO, method 800 proceeds to operation 895. At operation 895, the number of transactions is increased by one, and the maximum number of connections for the node is not updated. Method 800 may then take place again after another request is routed to a node and processed by that node.

Figure 9:
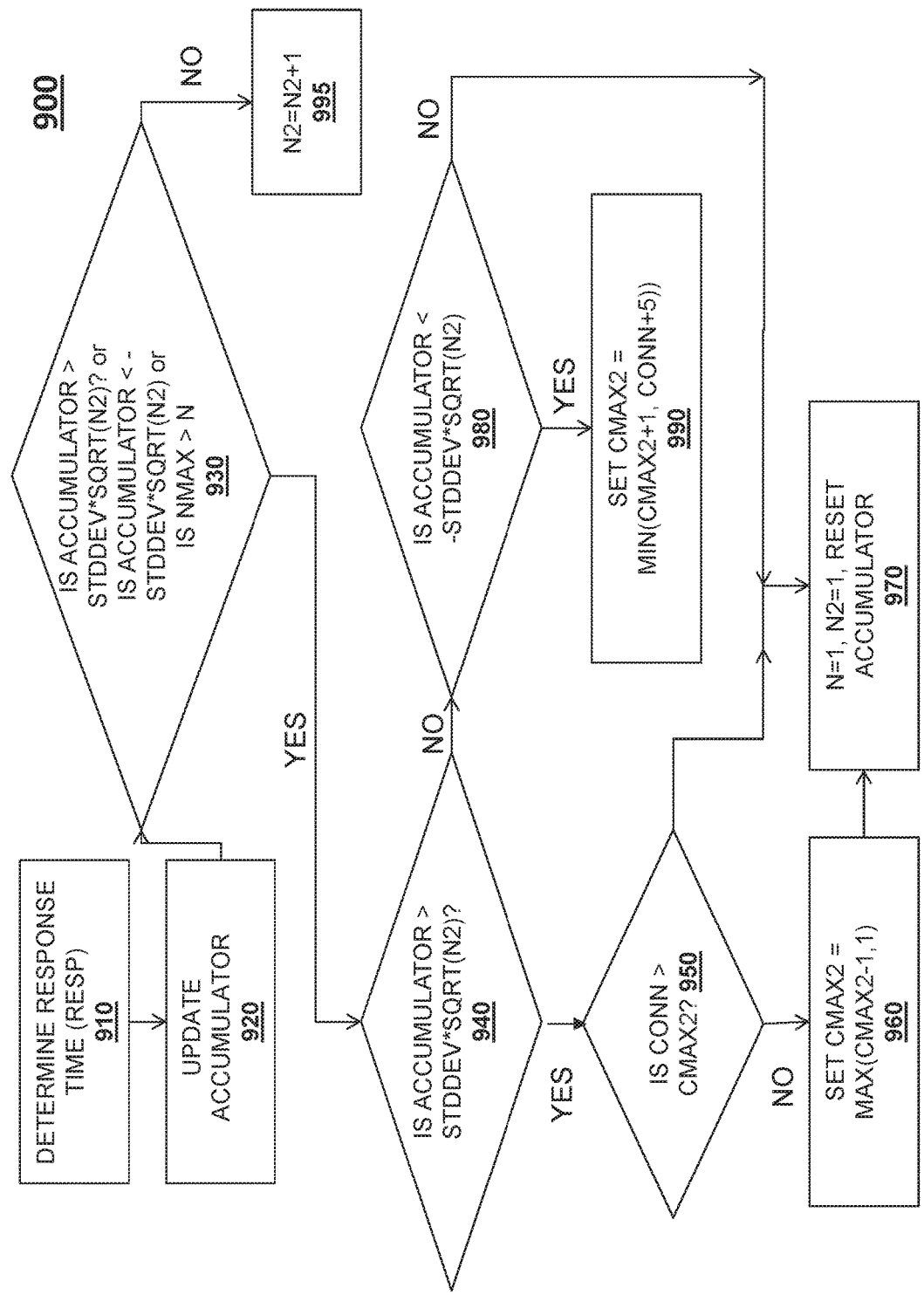
FIG. 9 is a flowchart illustrating a method of updating a maximum number of connections for a node in a degraded state, according to some example embodiments.

As described above, the operations of method 800 occur after a request is routed and processed by a node, to provide feedback in the form of the response time, which is then incorporated into the maximum number of connections for the node. In one embodiment, the degraded state maximum number of connections for a node (i.e., the CMax2 value) is also updated after a request is routed and processed by the node. FIG. 9 depicts a flowchart of a method 900 for updating the degraded state maximum number of connections for a node, which is similar in some respects to the method 800 of FIG. 8. Method 900 may be performed by, in one embodiment, an agent 540-1, 550-1, 560-1 . . . 570-1, or by a group load balancer module 535-1, 535-2, 535-3.

At operation 910 of method 900, the response time for the request is determined. An accumulator variable for the node is then increased by the difference between the response time for the request and the median service level agreement for the request type, multiplied by 1.1 (for the degradation factor), at operation 920. At operation 930, a determination is made, based on three separate factors. If the result of any of the factors is a positive determination, method 900 proceeds to operation 940. First, at operation 930, if the accumulator value is greater than the standard deviation of the response time (e.g., the difference between the response time and the mean response time) multiplied by the square root of the number of transactions in the degraded state (denoted as "N2") which resulted in the accumulator value, method 900 proceeds to operation 940. Second, at operation 930, if the accumulator value is less than the opposite of the standard deviation multiplied by the square root of the number of transactions in the degraded state which resulted in the accumulator value, method 900 proceeds to operation 940. Third, if the degraded state maximum number of connections to the node is greater than the number of connections to the node, method 900 proceeds to operation 940.

At operation 940, a determination is made as to whether the accumulator value is greater than the standard deviation of the response time multiplied by the square root of the number of transactions in the degraded state which resulted in the accumulator value. If so, method 900 proceeds to operation 950. At operation 950, a determination is made as to whether the number of connections to the node (denoted as "CONN") exceeds the degraded state maximum number of connections for the node (denoted as "CMAX2"). If operation 950 results in a NO, method 900 proceeds to operation 960, where the degraded state maximum number of connections is set to the maximum of: the degraded state maximum number of connections minus one, and one. Method 900 then proceeds to operation 970, where the accumulator value is reset. If operation 950 results in a YES, method 900 proceeds to operation 970, where the number of transactions is reset, and the accumulator value is reset.

At operation 940, if the accumulator value is not greater than the standard deviation of the response time multiplied by the square root of the number of transactions in the degraded state which resulted in the accumulator value, method 900 proceeds to operation 980. At operation 980, a determination is made based on whether the accumulator value is less than the opposite of the standard deviation multiplied by the square root of the number of transactions in the degraded state which resulted in the accumulator value. If operation 980 results in a YES, the maximum number of connections is set to the minimum of the current degraded state maximum number of connections plus one, or the current number of connections plus five. If operation 980 results in a NO, then the third condition at operation 930 exists; specifically, the number of connections to the node exceeds the maximum number of connections to the node, and therefore method 900 proceeds to operation 970, where the accumulator value is reset.

If, at operation 930, all three factors result in a NO, method 900 proceeds to operation 995. At operation 995, the number of transactions is increased by one, and the maximum number of connections for the node is not updated. Method 990 may then take place again after another request is routed to a node and processed by that node.

According to various example embodiments, one or more of the methodologies described herein may facilitate load balancing. Moreover, one or more of the methodologies described herein may facilitate registering computing nodes or applications for operation. Hence, one or more the methodologies described herein may facilitate load balancing, as well as registering computing nodes or applications for operation.

When these effects are considered in aggregate, one or more of the methodologies described herein may obviate a need for certain efforts or resources that otherwise would be involved in load balancing. Efforts expended by a user in load balancing may be reduced or made more efficient by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 10A:
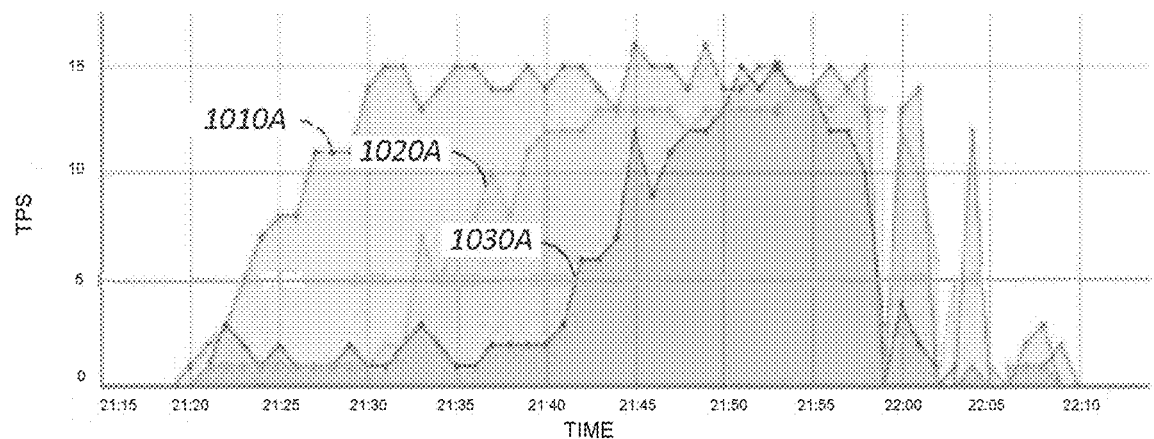
FIG. 10A is a graph illustrating how many transactions are being processed by each active machine, or node, of an ordered list of nodes, at various load levels as illustrated in FIG. 11, according to some embodiments.
Figure 10B:
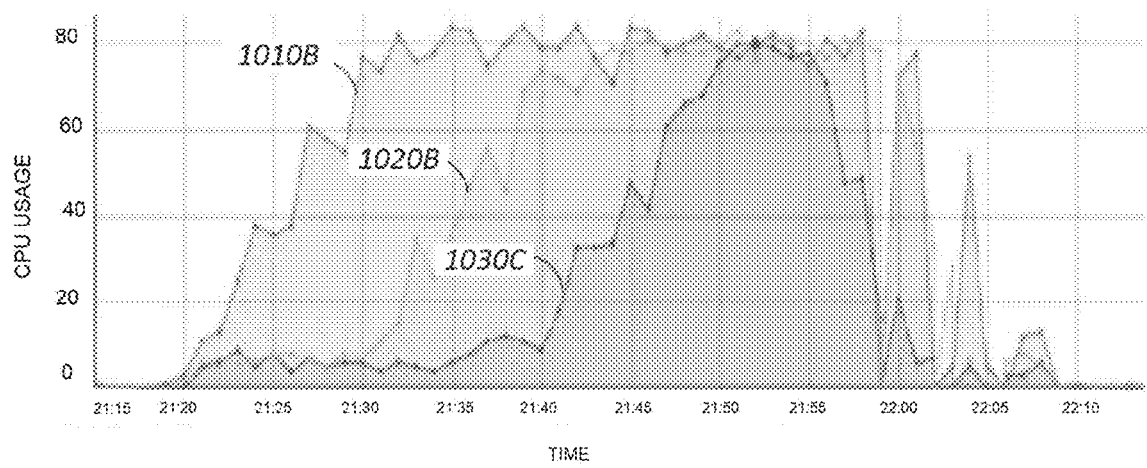
FIG. 10B is a graph illustrating a utilization level of the active machines or nodes, of an ordered list of nodes, at various load levels as illustrated in FIG. 11, according to some embodiments.
Figure 10C:
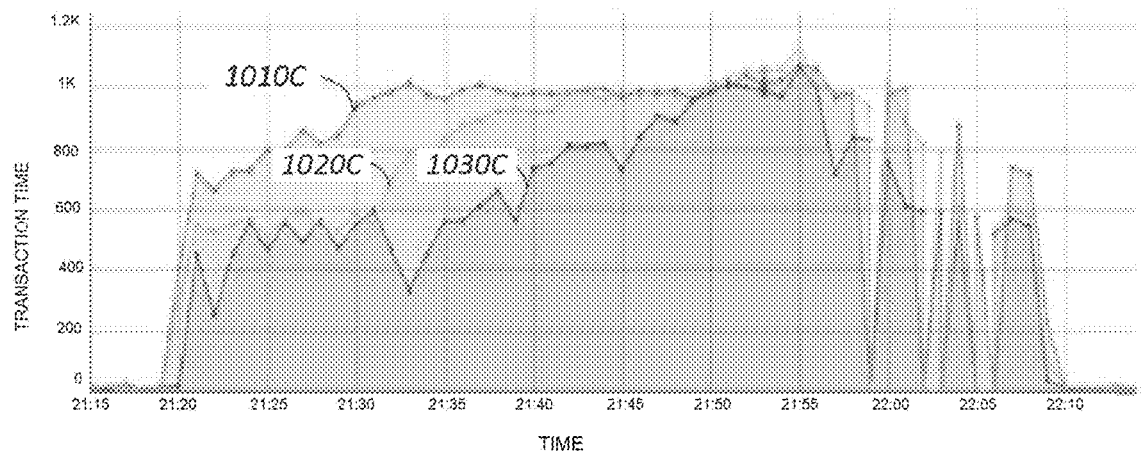
FIG. 10C is a graph illustrating the average response time of the transactions processed by active machines, or nodes, of an ordered list of nodes, at various load levels as illustrated in FIG. 11, according to some embodiments.
Figure 11:
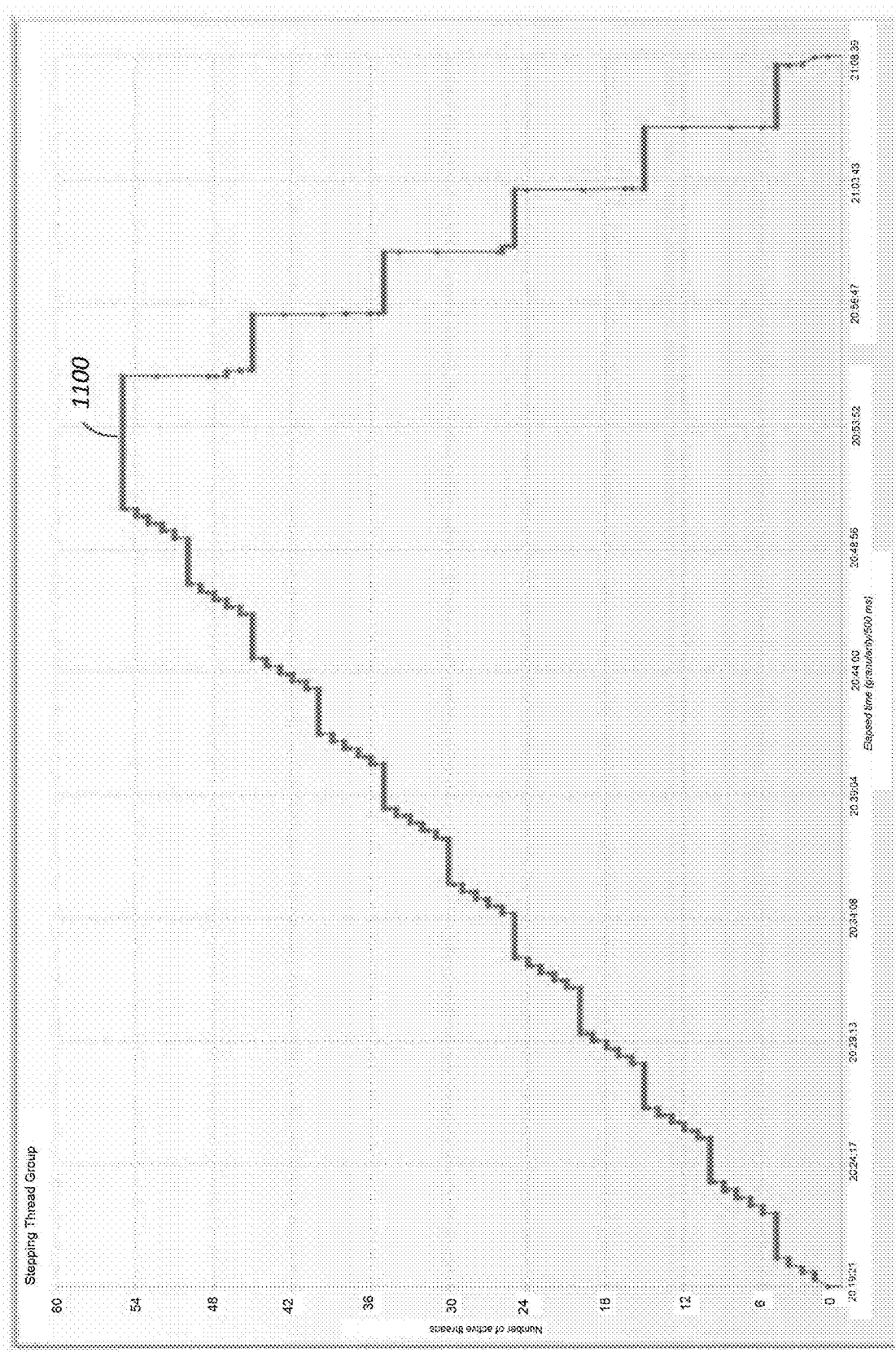
FIG. 11 is a graph illustrating steadily increasing, and then decreasing, transactions arriving for an ordered list of nodes, according to some embodiments.

FIG. 10A is a graph illustrating how many transactions are being processed by each active machine, or node, of an ordered list of nodes, according to some embodiments, at a given time, where the x-axis represents time. FIG. 10B is a graph illustrating a utilization level of the active machines or nodes, of an ordered list of nodes, according to some embodiments. FIG. 10C illustrates average response time of the transactions processed by a node. Each of the graphs of FIGS. 10A-10C represents a one minute perfmon, or monitor of performance. Each point on the graphs represents the corresponding value of the attribute averaged over one minute. FIG. 11 is a graph illustrating steadily increasing, and then decreasing, transactions arriving for an ordered list of nodes, according to some embodiments. As can be seen in FIG. 11, transactions 1100 coming into this set of nodes will be steadily increasing and then begin decreasing at about 20h53. The time stamps in FIG. 11 are in PST while those in the graphs of FIGS. 10A-10C are in MST.

As can be seen in FIG. 10A, a first machine 1010A takes most of the transactions as illustrated by the rising plot of 1010A in FIG. 10A, with corresponding rise in CPU utilization. This corresponding rise in CPU utilization is see as the rising plot 1010B of FIG. 5B, until a little after 21h30 when the response time begins to violate the given SLA, of 1 sec in the current example embodiment. At that point, the load balancer 330 of FIG. 3, which operates through load balancer module 270 of FIG. 2, starts giving the newly incoming transactions to the second node 1020A of FIG. 10A and the first two nodes 1010A and 1020A get into dynamic equilibrium. At approximately 21h40, as the second node 1020A processes as many transactions as it can within the given SLA and starts violating the SLA for anything more, third node 1030A is accessed to process any additional transactions. All three nodes 1010A, 1020A, and 1030A are sharing the incoming transactions equally at approximately 21h53 (20h53 PST) when incoming load 600 starts falling as seen in FIG. 11. At that point, the last node brought in, 1030A, is gradually let go, followed by the second node 1020B, followed by the first node 1010A. In other words, the nodes are brought in as and when needed and let go as and when not needed. It can also be seen that all three machines put together do not have enough computing resources to complete the incoming transactions within SLA around 21h55, and the system lets the SLA suffer briefly as there was no new node brought in at that time. Had there been a fourth node available, this system would have started giving the incoming transactions to that one to keep the SLA, and that would be first node to be let go when the incoming traffic slows down around 20h56 MST.

Figure 12:
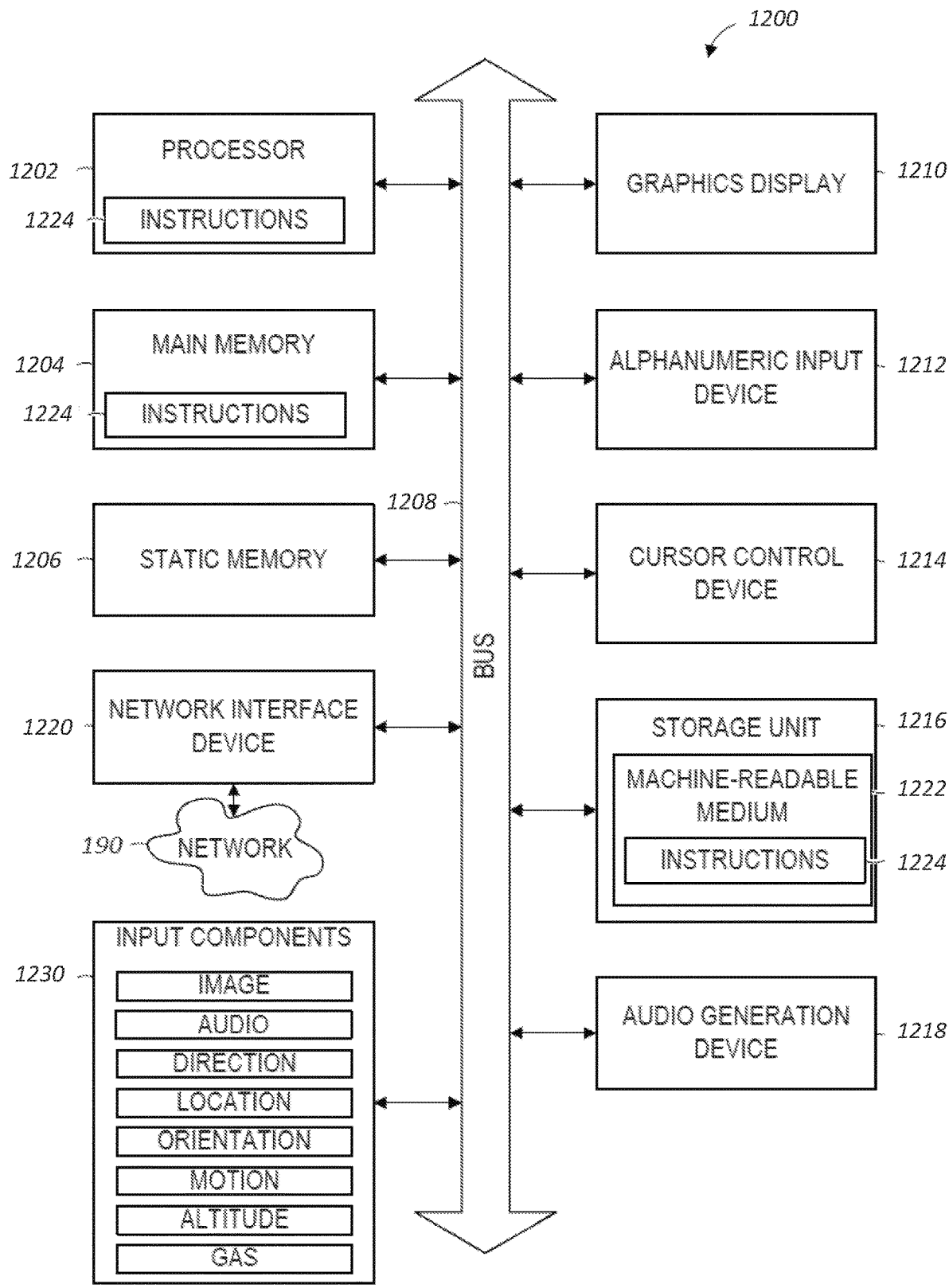
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1224 from a machine-readable medium 1222 (e.g., a non-transitory machine-readable medium, a machine-readable storage medium, a computer-readable storage medium, or any suitable combination thereof) and perform any one or more of the methodologies discussed herein, in whole or in part. Specifically, FIG. 12 shows the machine 1200 in the example form of a computer system (e.g., a computer) within which the instructions 1224 (e.g., software, a program, an application, an applet, an app, or other executable code) for causing the machine 1200 to perform any one or more of the methodologies discussed herein may be executed, in whole or in part.

In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include any collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The processor 1202 may contain microcircuits that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein.

The machine 1200 may further include a graphics display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a cursor control device 1214 (e.g., a mouse, a touchpad, a trackball, a joystick, a motion sensor, an eye tracking device, or other pointing instrument), a storage unit 1216, an audio generation device 1218 (e.g., a sound card, an amplifier, a speaker, a headphone jack, or any suitable combination thereof), and a network interface device 1220.

The storage unit 1216 includes the machine-readable medium 1222 (e.g., a tangible and non-transitory machine-readable storage medium) on which are stored the instructions 1224 embodying any one or more of the methodologies or functions described herein. The instructions 1224 may also reside, completely or at least partially, within the main memory 1204, within the processor 1202 (e.g., within the processor's cache memory), or both, before or during execution thereof by the machine 1200. Accordingly, the main memory 1204 and the processor 1202 may be considered machine-readable media (e.g., tangible and non-transitory machine-readable media). The instructions 1224 may be transmitted or received over the network 190 via the network interface device 1220. For example, the network interface device 1220 may communicate the instructions 1224 using any one or more transfer protocols (e.g., hypertext transfer protocol (HTTP)). The machine may function with the Internet Protocol (IP) as a communications protocol in an Internet protocol suite for relaying datagrams across network boundaries. The routing function of the IP enables internetworking via the Internet. The Internet protocol suite has the task of delivering packets from the source host to the destination host based on the IP addresses in the packet headers. For this purpose, IP defines packet structures that encapsulate the data to be delivered. It also defines addressing methods that are used to label the datagram with source and destination information. The connection-oriented Transmission Control Protocol (TCP) may be used, often referred to as TCP/IP. The machine may operate with various versions of IP, including without limitation, Internet Protocol Version 4 (IPv4), Internet Protocol Version 6 (IPv6), and may be adapted for other and future protocols. The apparatus may function with various layers including an application layer, transport layer, Internet layer and link layer. Various transport layers may be used in addition to TCP. These transport layers may include User Datagram Protocol (UDP), Datagram Congestion Protocol (DCCP), Stream Control Transmission Protocol (SCTP), Resource Reservation Protocol (RSVP), and others. In operation, the request for compute service is initiated at a client machine by a user selecting a button, or selectable icon, for making the request at a user interface (UI) of the client machine. There is then a message exchange between the server and the client machine, the message exchange utilizing a network interface of the client machine and a network interface of the server.

In some example embodiments, the machine 1200 may be a portable computing device, such as a smart phone or tablet computer, and have one or more additional input components 1230 (e.g., sensors or gauges). Examples of such input components 1230 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1224 for execution by the machine 1200, such that the instructions 1224, when executed by one or more processors of the machine 1200 (e.g., processor 1202), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
    a hardware processor; and
    a non-transitory computer-readable medium having stored thereon instructions that are executable to cause the system to perform operations comprising:
        assigning a first sub-group of a plurality of requests for computing services to a first computing node in a plurality of computing nodes, wherein a second computing node in the plurality of computing nodes is inactive when the first sub-group of the plurality of requests is assigned to the first computing node based on first feedback received from the first computing node indicating that the first computing node has not reached a work assignment termination condition;
        subsequent to the assigning the first sub-group of the plurality of requests for computing services to the first computing node, obtaining, from the first computing node, second feedback related to a capacity of the first computing node to process requests according to a set of predetermined servicing criteria;
        determining that the first computing node has reached the work assignment termination condition based on the second feedback;
        in response to determining that the first computing node has reached the work assignment termination condition, activating the second computing node; and
        assigning a second sub-group of the plurality of requests to the second computing node in the plurality of computing nodes.

2. The system of claim 1, wherein the work assignment termination condition indicates an inability to process additional requests for computing services without exceeding a service level agreement (SLA) specified time.

3. The system of claim 1, wherein the work assignment termination condition indicates an inability to accept additional requests for computing services.

4. The system of claim 1, wherein the operations further comprise:
    deactivating a particular computing node in the plurality of computing nodes in response to detecting a decline in an incoming volume of requests for computing services.

5. The system of claim 4, wherein the operations further comprise:
    selecting, from the plurality of computing nodes, the particular computing node to be deactivated based on the particular computing node having been most recently assigned a request for computing services.

6. The system of claim 1, wherein each of the plurality of requests for computing services comprises a request to perform an electronic transaction for an electronic transaction service.

7. The system of claim 6, wherein the electronic transaction service is an electronic payment transaction service.

8. The system of claim 1, wherein the plurality of computing nodes is part of a first group of computing nodes assigned to process a first type of computing service requests, and wherein the operations further comprise assigning one or more computing nodes in the plurality of computing nodes to a second group of computing nodes assigned to process a second type of computing service requests in response to an indication of a decrease in traffic volume for the first type of computing service requests.

9. A non-transitory computer-readable medium having stored thereon instructions executable by a computer system to cause the computer system to perform operations comprising:
    assigning a first sub-group of a plurality of requests for computing service to a first computing node in a plurality of computing nodes, wherein a second computing node in the plurality of computing nodes is idling when the first sub-group of the plurality of requests is assigned to the first computing node based on first feedback received from the first computing node indicating that the first computing node has not reached a work assignment termination condition;
    subsequent to the assigning the first sub-group of the plurality of requests for computing services to the first computing node, obtaining, from the first computing node, second feedback related to a capacity of the first computing node to process requests according to a set of predetermined servicing criteria;
    determining that the first computing node has reached the work assignment termination condition based on the second feedback, wherein the work assignment termination condition indicates at least one of (i) an inability to process additional requests for computing service according to a service level agreement (SLA), or (ii) an inability to accept the additional requests for computing service;
    in response to determining that the first computing node has reached the work assignment termination condition, activating the second computing node; and
    assigning a second sub-group of the plurality of requests to the second computing node.

10. The non-transitory computer-readable medium of claim 9, wherein the operations further comprise:
    determining that the plurality of computing nodes has reached the work assignment termination condition;
    determining a degraded SLA based on a degradation of the SLA, wherein the degraded SLA provides a less restrictive requirement than the SLA; and
    assigning a second plurality of requests to ones of the plurality of computing nodes according to the degraded SLA.

11. The non-transitory computer-readable medium of claim 9, wherein the plurality of computing nodes comprises one or more virtual machines.

12. The non-transitory computer-readable medium of claim 9, wherein the operations further comprise:
    selecting, from the plurality of computing nodes, the first computing node for processing the first sub-group of the plurality of requests based on a random selection.

13. The non-transitory computer-readable medium of claim 9, wherein the operations further comprise:
   determining that the plurality of computing nodes has reached the work assignment termination condition; and
   in response to determining that the plurality of computing nodes has reached the work assignment termination condition, adding one or more computing nodes to the plurality of computing nodes.

14. The non-transitory computer-readable medium of claim 9, wherein the operations further comprise:
   causing a particular computing node in the plurality of computing nodes to idle in response to detecting a decline in an incoming volume of requests for computing service.

15. The non-transitory computer-readable medium of claim 14, wherein the operations further comprise:
   selecting, from the plurality of computing nodes, the particular computing node for idling based on the particular computing node having been most recently assigned a request for computing service.

16. The non-transitory computer-readable medium of claim 9, wherein each of the plurality of requests for computing service comprises a request to perform an electronic transaction for an electronic transaction service.

17. A method, comprising:
   assigning a first sub-group of a plurality of requests for computing service to a first computing node in a plurality of computing nodes, wherein a second computing node in the plurality of computing nodes is inactive when the first sub-group of the plurality of requests is assigned to the first computing node based on first feedback received from the first computing node indicating that the first computing node has not reached a work assignment termination condition;
   obtaining, from the first computing node, second feedback related to a capacity of the first computing node to process requests according to a set of predetermined servicing criteria;
   determining that the first computing node has reached the work assignment termination condition based on the second feedback;
   in response to determining that the first computing node has reached the work assignment termination condition, activating the second computing node; and
   assigning a second sub-group of the plurality of requests to the second computing node.

18. The method of claim 17, wherein the work assignment termination condition indicates an inability to process additional requests for computing service without exceeding a service level agreement (SLA) specified time.

19. The method of claim 17, wherein the work assignment termination condition indicates an insufficient number of available data connections.

20. The method of claim 17, further comprising causing a particular node in the plurality of computing nodes to idle in response to detecting a decline in an incoming volume of requests for computing service.

* * * * *